United States Patent [19]

Stover

[11] 3,924,461

[45] Dec. 9, 1975

[54] MONITORING SYSTEM FOR DETECTING DEFECTIVE RAILS OR ROAD BEDS

[76] Inventor: Harris A. Stover, 10306 Mountington Court, Vienna, Va. 22180

[22] Filed: Aug. 20, 1974

[21] Appl. No.: 499,030

[52] U.S. Cl. .................................... 73/146; 33/144
[51] Int. Cl.² .......................................... B61K 9/00
[58] Field of Search ........ 73/146, 105; 33/144, 146, 33/338, 287

[56] References Cited
UNITED STATES PATENTS

| | | | |
|---|---|---|---|
| 3,353,404 | 11/1967 | Swift | 73/146 |
| 3,638,482 | 2/1972 | Schubert | 73/146 |

Primary Examiner—Donald O. Woodiel
Attorney, Agent, or Firm—Hill, Gross, Simpson, Van Santen, Steadman, Chiara & Simpson

[57] ABSTRACT

Monitoring apparatus and system including a car movable over the rails and including rail following guides upon which accelerometers are mounted or which are attached to sensing means so as to produce signals indicative of variations in the rails. A recorder receives inputs from a plurality of sensing devices, as well as the signal indicative of the position at which measurements were taken, and a computer can be provided the output from the sensors so as to record or display rail variations. A modification utilizes radar transmitter and receiver for sensing the rail variations with radiant energy.

10 Claims, 15 Drawing Figures

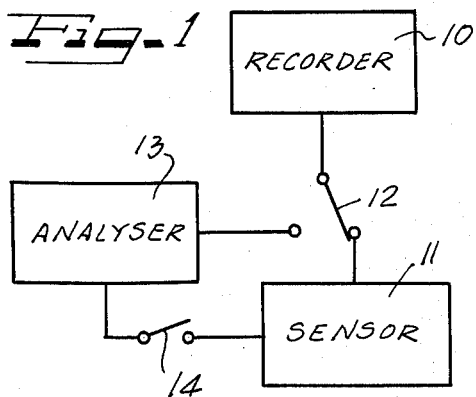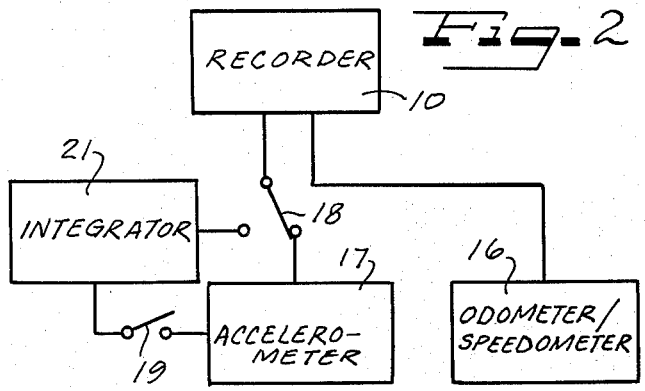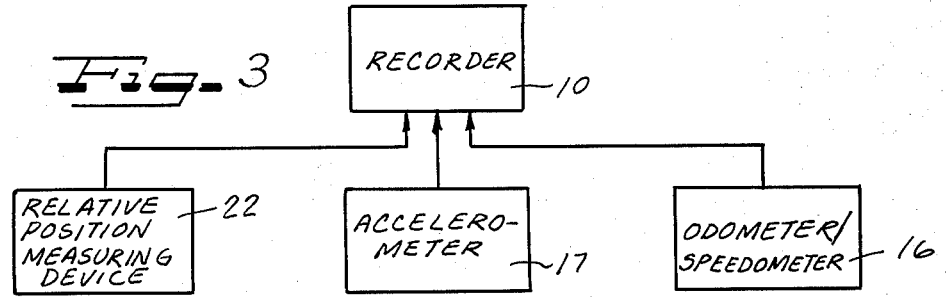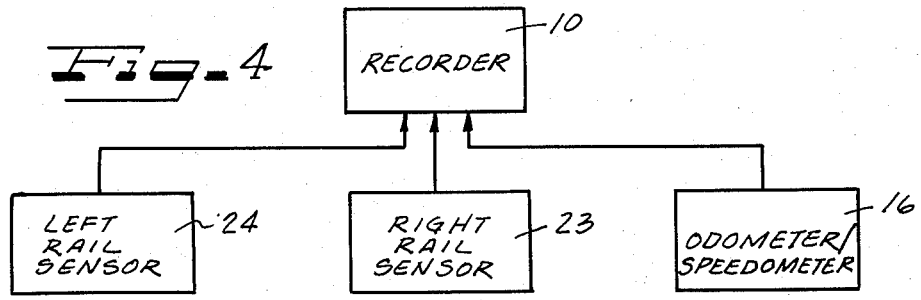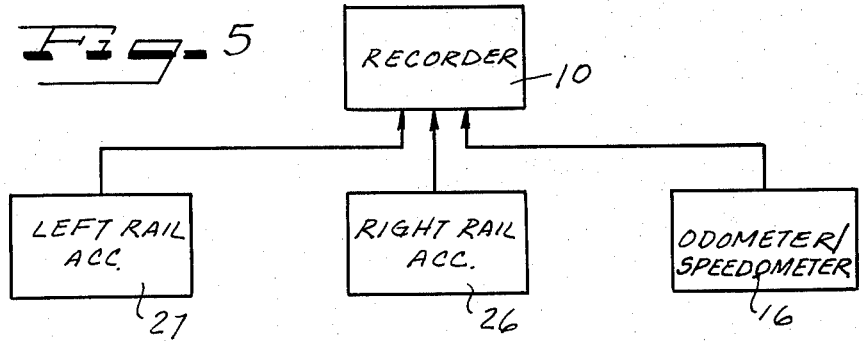

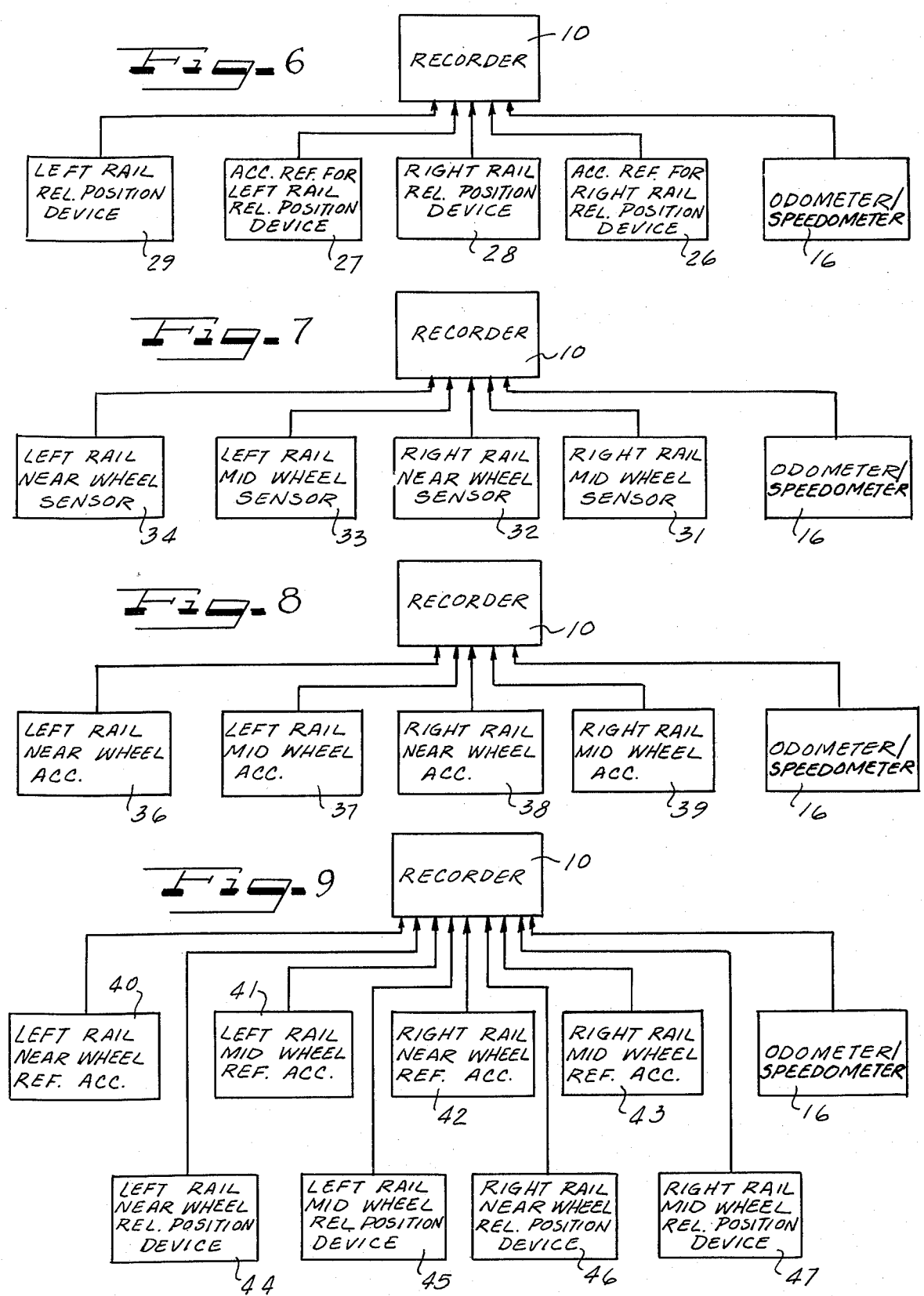

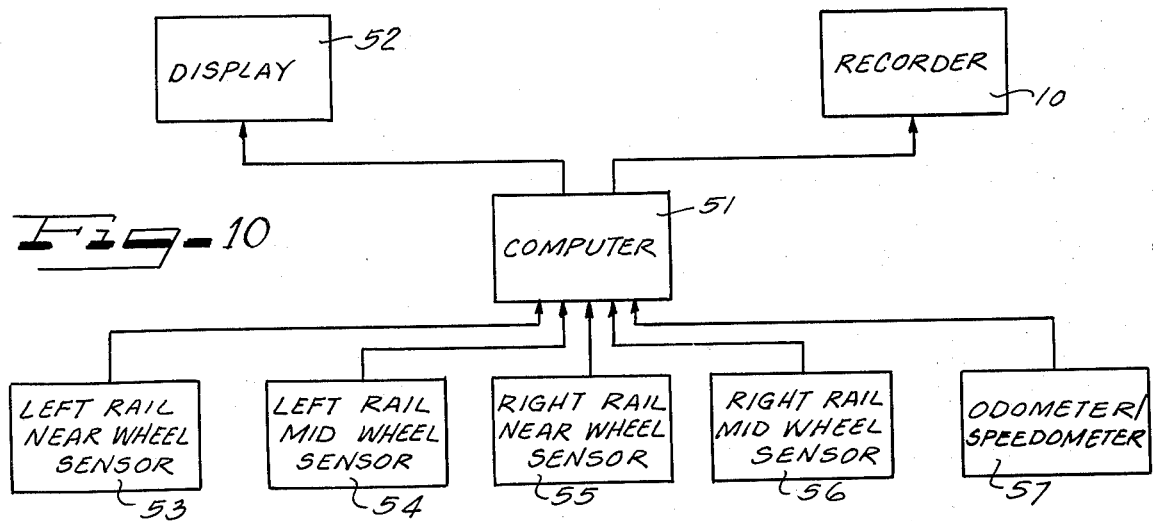
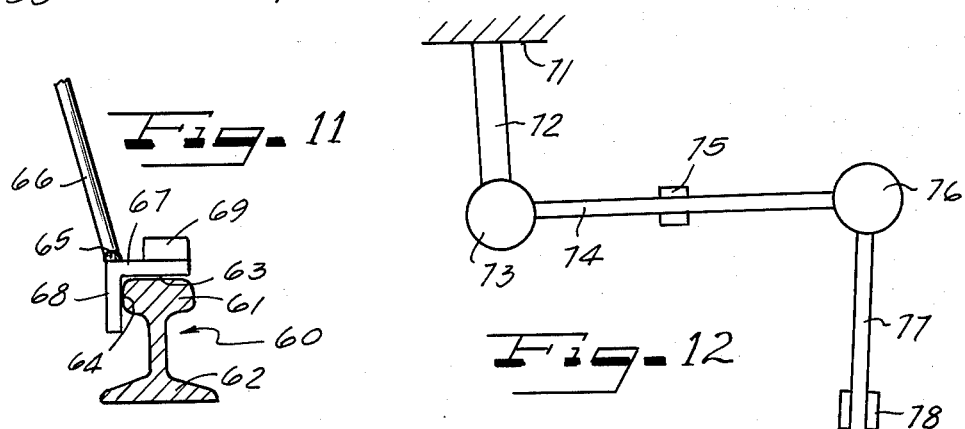
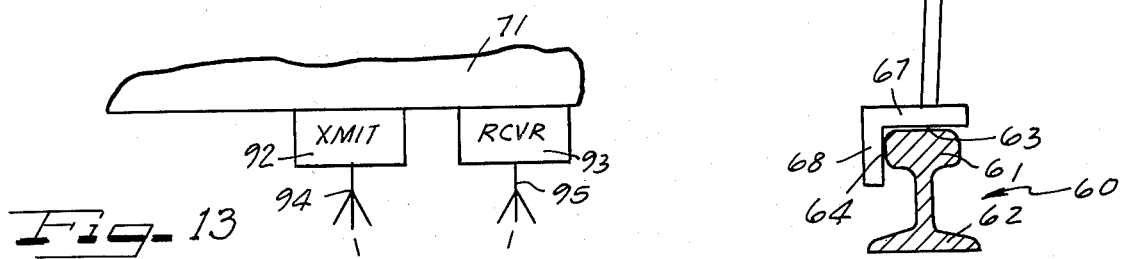
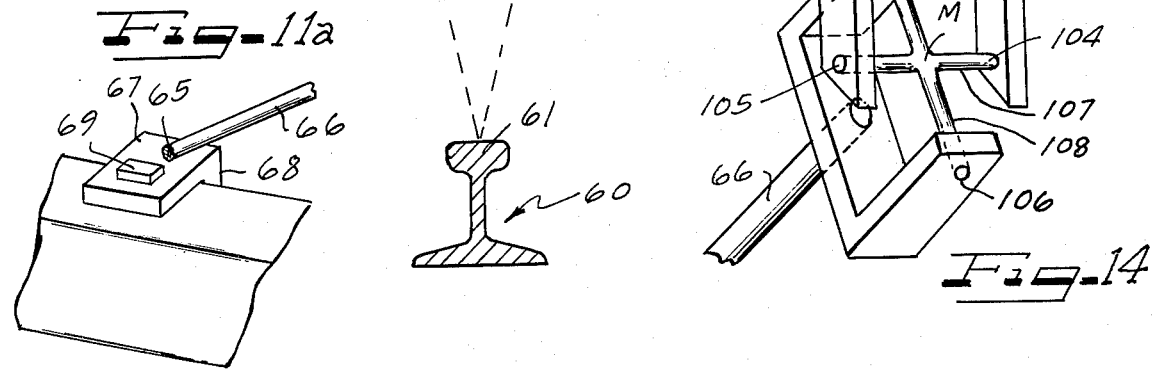

3,924,461

MONITORING SYSTEM FOR DETECTING DEFECTIVE RAILS OR ROAD BEDS

BACKGROUND OF THE INVENTION

1. Field of the Invention

This invention relates in general to monitoring systems for rails.

2. Description of the Prior Art

Railroads perform an essential function in contemporary society in that they are required for the transportation of many items. In the United States and most countries, the railroad beds have been in use for many years, and a large percentage of the beds have become uneven, irregular resulting in rough, ineffective operation. As a matter of fact, many accidents have resulted from failure of equipment and rough and irregular rails and road beds. The maximum velocity at which passengers and freight can be moved over the rails is a function of the smoothness of the road bed, and the condition of the rails.

SUMMARY OF THE INVENTION

The present invention provides monitoring and recording apparatus for measuring the variations of the rails and road beds. A test rail vehicle or standard vehicle fitted with the test equipment moves over the rails and is provided with rail following guides which engage the flange side of the head of the rail, as well as the top surface of the head of the rail, so as to provide a profile of the rail correlated with the position. The rail guide may include a pair of servos which measure the vertical and transverse variations of the rail and provide it to the system in the monitoring car where it is recorded and/or supplied to a computer to analyze and indicate the condition of the rail. In one embodiment, a radar transmitter and receiver is utilized to scan the rail to obtain the contour information.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a block diagram of the invention;
FIG. 2 illustrates a modification of the invention;
FIG. 3 is a block diagram of the invention;
FIG. 4 illustrates the invention;
FIG. 5 illustrates the invention using an accelerometer;
FIG. 6 is a block diagram illustrating the invention;
FIG. 7 illustrates the invention;
FIG. 8 is a block diagram illustrating the invention;
FIG. 9 is a block diagram illustrating the invention;
FIG. 10 is a block diagram illustrating the invention;
FIG. 11 is a detailed view illustrating a rail following guide;
FIG. 11a is a side view of the guide;
FIG. 12 illustrates a modification of the rail following guide;
FIG. 13 illustrates a modification of the invention; and
FIG. 14 illustrates a mounting device.

DESCRIPTION OF THE PREFERRED EMBODIMENTS

FIG. 1 illustrates in block diagram form the basic monitoring equipment for electronically or electromechanically monitoring the condition of railroad rails and road beds. The sensor 11 senses the condition of the rail and supplies it to a recorder 10 directly through a switch 12, or indirectly through a switch 14 and an analyzer 13.

FIG. 2 illustrates in block form monitoring equipment, wherein the sensor comprises an accelerometer 17 which is constrained by springs or other mechanical or electromechanical means so that it rides along the edge of the rail in a manner similar to a normal railroad wheel. The accelerometer 17 has low mass so that it is capable of accurately following the rail at very high speeds. Horizontal and vertical deflections of the rail from its normal position can be determined by multiple integration of the output of the accelerometer 17, and this may be accomplished by the integrater 21, which receives the output of the accelerometer 17 through the switch 19. The output of the integrater 21 is supplied to the recorder 10. An odometer 16 supplies an input to the recorder so that the position along the length of the rail can be correlated with the measurements being made. Alternatively, the output of the accelerometer may be recorded on the recorder by moving the switch 18 to receive the output of the accelerometer and the recorded output can be integrated at a later date.

FIG. 3 illustrates in block form, a sensor 22 for measuring the horizontal and vertical position of the rail and comprises an accelerometer 17, which is rigidly attached to the vehicle used to transport the monitor and a relative position measuring device 22 which measures the position of the rail relative to the position of the accelerometer and engages the rail. The output of the accelerometer 17 and the measuring device 22 are supplied to the recorder 10, along with an output from an odometer 16, and the information thus provided can be combined mathematically to provide the desired information giving the horizontal and vertical positions of the rail at various locations.

FIG. 4 is a block diagram utilizing separate sensors including a left rail sensor 24 and a right rail sensor 23, which respectively engage and sense the two rails. This information is supplied with the output of the odometer 16 to the recorder 10. The information from the two sensors can be combined mathematically to indicate the condition of the rails at different positions.

FIG. 5 is a block diagram illustrating a recorder 10 receiving an input from the odometer 16, including a left rail accelerometer 27, which is constrained to follow the left-hand rail, and a right rail accelerometer 26, which is constrained to follow the right rail. Calculations can be made to indicate the condition of the rails from these inputs.

FIG. 6 is a block diagram of monitoring equipment similar to that illustrated in FIG. 4, wherein the recorder 10 receives signals from a left rail relative position device 29 and from an accelerometer 27 which rides on the left rail. It also receives inputs from a right rail relative position device 28 and from an accelerometer 26 which rides on the right rail. An odometer 16 supplies an input to the recorder 10.

FIG. 7 illustrates a system wherein there are two sensors for monitoring each of the rails with one of the sensors for each rail being mounted on the vehicle at a maximum position from the wheels, and with the other pair of sensors being mounted near the wheels. For example, the sensor 33 is mounted to sense the position of the left rail, and is mounted near the center of the vehicle, and the sensor 31 is mounted near the center of the vehicle, and is mounted to sense the right rail. The sensors 34 and 32 are mounted near the wheels and respectively sense the left and right rails. Thus, the sensors 34 and 32 sense the position of the rail while it is under the heavy loading of the wheels, and by combining the results measured by the near wheel sensor with the mid-wheel sensor, the effect of heavy loading on the position of the rail can be determined. The information indicating the amount of deflection of the rail under load is very useful in determining weaknesses in the rail and,/or road bed.

FIG. 8 is a block diagram for monitoring equipment similar to the apparatus shown in FIG. 7, wherein the sensors 34, 33, 32 and 31 have been replaced by accelerometers 36, 37, 38 and 39 for respectively measuring the acceleration of the rail near the wheels and in the mid-portion of the vehicle.

FIG. 9 is a block diagram of a modification of the monitoring equipment similar to that shown in FIG. 7, including a left rail near wheel reference accelerometer 40 and a left rail near wheel relative position sensing device 44, as well as a left rail mid-wheel reference accelerometer 41 and a left mid-wheel relative position device 45. A right rail near wheel reference accelerometer 42 and a right rail near wheel relative position sensing device 46 are mounted near the wheel to engage the right rail, and a right rail mid-wheel reference accelerometer 43 and a right rail mid-wheel relative position device 47 are mounted at the center of the vehicle. An odometer 16 provides an input to the recorder also.

The invention described thusfar consists of sensors and accelerometers and a recorder so as to record the information from the sensors for later playback and analysis. It also is to be understood that the recorder could be eliminated and that the information could be directly supplied to a computer for real time analysis and display of the information. Such a system is illustrated in FIG. 10.

A computer 51 receives input from a left rail near wheel sensor 53 and from a left rail mid-wheel sensor 54, as well as from a right rail near wheel sensor 55 and a right rail mid-wheel sensor 56. An odometer 16 also supplies an input to the computer 51. The mid-wheel sensors 54 and 56 supply information under minimum wheel loading, wherein the sensors 53 and 55 supply information under maximum wheel loading. The odometer, of course, provides information as to the position of the monitor along the length of the rail. The information from the sensors of FIG. 10 may be in any of several different forms. Such information may consist of horizontal and vertical components of acceleration as the sensor moves along the rail, or it may consist of horizontal and vertical components of acceleration of a portion of the monitoring system as the sensor moves along the track along with measurements of direction and distance to the rail from the accelerometers. The computer receives the information and first reduces it from the form provided by the sensors to an actual measurement of the position of the rail. For example, output of the accelerometer may be integrated so as to convert it into a velocity and then integrated again to convert it into a distance. The computer 51 may also perform mathematical operations such as calculating the relative positions of the two rails and/or calculating the relative deflection of each rail under maximum wheel loading as compared to minimum wheel loading. The computer 51 may also apply predetermined criteria based on established standards as to whether maintenance or repair work is needed and the urgency of such maintenance and repair. In addition, the computer may process the information into a desirable form for presentation on a display device 52. Also, the output from the computer may be recorded on the recorder 10 for future reference and analysis. Under certain circumstances, the computer 51 may forward the data from the sensors 53 through 56 to the recorder for later analysis.

FIG. 11 illustrates apparatus for providing an accelerometer 69 which is constrained by spring loading to follow the rail. The rail 60 has a foot 62 and a head 61 with a flange engaging side surface 64 and a load carrying surface 63. A spring loaded guide arm 66 carries an L-shaped following member having horizontal portion 67 and a vertical portion 68 which engages the flange side of the rail 64. The L-shaped member is supported by a ball joint 65. The accelerometer 69 is mounted on the portion 67 or any other portion of the L-shaped following member and measures acceleration as the rail guide moves along the rail.

Another view relative to the drawing of FIG. 11 shows that in addition to the vertical angle formed by the guide arm 66 in a plane perpendicular to the rail it also has a vertical angle in a plane parallel to the rail. It is principally this slant in the plane parallel to the rail that gives it the necessary freedom to move up and down relative to the railroad car while the angle in the plane perpendicular to the rail is principally involved with the horizontal movement in a direction perpendicular to the rail.

FIG. 12 illustrates a method of measuring the position of the rail relative to the vehicle. The mounting arm 72 is rigidly attached to the vehicle 71 and a servo-controlled rotary joint 73 is attached to the end of the arm 72 and supports a connecting arm 74. The servo 73 controls the position of the arm 74 relative to the arm 72. Another servo-controlled rotary joint 76 is attached to the other end of arm 74 and supports an arm 77 and controls the angle between the two arms. Rail following guide having horizontal portion 67 for engaging the upper surface 63 of the rail and side portion 68 for engaging the flange engaging portion 64 of the rail engage the rail. Strain gauge 78 is mounted on arm 77 and detects the bending strain in the arm 77. Strain gauge 75 is mounted on the arm 74 and detects the bending strain in arm 74. The output of strain gauge 75 is supplied to the servo of the servo-controlled rotary joint 73 so as to control the angle between the connecting arm 74 and the arm 72 in a manner so as to maintain the bending strain of the guide arm 74 at a preselected constant value. The output of strain gauge 74 is connected to the servo of the servo-controlled rotary joint 76 so as to maintain the bending strain of arm 77 at a predetermined constant value. The result is that the rail following guides 67 and 68 follow the rail with nearly constant pressure on the rail. Outputs from the rotary joints 73 and 76 are supplied to the computer in the vehicle; and since all of the members are of known lengths and the strain is maintained nearly constant by the action of the servo mechanisms, the relative positions of the vehicles 71 and the rail 60 may be determined by trigonometric computations from the outputs from the servos in the rotary joints 73 and 76.

FIG. 14 shows a method of mounting the guide arm 66 to the railroad car. The two vertical members 101 and 103 are rigidly mounted to the railroad car. The two perpendicular shafts 107 and 108 are rigidly fastened at their centers to form a single piece. Rotary joints 102, 104, 105, and 106 permit shaft 66 to assume nearly any angular position below the mounting point on the railroad car. The rotary joints 102, 104, 105, and 106 can be spring loaded to provide torque in the correct direction to keep the L-shaped following member of FIG. 11 correctly positioned against the rail. Other spring loading methods will be obvious to those skilled in the art. At least one rotary joint 102 or 106 and 104 or 105 on each of the perpendicular shaft members 107 and 108 is equipped with electromechanical shaft position sensors. The electrical signals from these sensors are indicative of the angular position of the rotary points and can be used to indicate the direction of shaft 66 as it points away from the midpoint M of the shaft 107 between mounting members 101 and 103. This can be used to determine the vertical and horizontal displacement of the rail 60 relative to the railroad car. For purposes of illustration let mounting member 103 be mounted to the railroad car in a position directly in front of member 101. Let the electromechanical shaft position sensor for rotary joint 104 indicate the angle $\theta$ which is the angular displacement of the axis of shaft 108 from horizontal. Let the electromechanical shaft position sensor for rotary joint 106 indicate the angle $\phi$ which is the angular displacement of the axis of shaft 66 from the axis of shaft 107. Let the length of guide shaft 66 as measured from the reference midpoint M of shaft 107 or shaft 108 be R. Then the vertical displacement of the rail 60 from the reference midpoint M is given be the simple expression $R\sin\phi\lambda\cos\theta$. The horizontal displacement of the rail in a direction perpendicular to the desired direction of motion and relative to the same reference midpoint M is given by the simple expression $R\sin\phi\sin\theta$. By having a sensing mechanism of this type on each rail of the pair, the difference in vertical displacement of the two rails relative to the railroad car and the spacing between rails are conveniently monitored. With the electrical signals supplying the values $\theta_L$ and $\phi_L$ for the left rail and $\theta_R$ and $\phi_R$ for the right rail, a computation of the difference in vertical displacement of the two rails (relative to the railroad car) can be made using the simple expression $R(\sin\phi_L\cos\theta_L - \sin\phi_R\cos\theta_R)$. A good simple computation for the spacing between rails based only upon the horizontal measurement is $R\sin\phi_L\sin\theta_L - R\sin\phi_R\sin\theta_R + D$.

where D is determined by the positions that the sensors are mounted on the railroad car. A somewhat more complex expression for the distance between rails which includes the vertical displacement is $\sqrt{(R\sin\phi_L\sin\theta_L - R\sin\phi_R\sin\theta_R + D)^2 + (R\sin\phi_L\cos\theta_L - R\sin\phi_R\cos\theta_R)^2}$ The output of the accelerometer 69 on the L-shaped following member of FIG. 11 may also be used for a number of useful calculations. Assume that the accelerometer has two output components, one for vertical acceleration and one for horizontal acceleration in the direction perpendicular to the desired direction of train motion. Each of these may be considered to be a centripital acceleration, one due to curvature of the rail in a vertical plane and the other due to curvature of the rail in a horizontal plane. Centripital acceleration is determined by the product of the curvature and the square of the velocity. By dividing the output of the accelerometer by the square of the speed of the train as determined from ODOMETER/SPEEDOMETER 16, (If only the ODOMETER is provided, the speed may be obtained by taking the derivative of the ODOMETER output with respect to time.) a measure of the curvature of the rail is obtained. If both vertical and horizontal accelerometers are employed, measure of curvature in both the vertical and horizontal planes will be obtained. Knowing the curvature in either plane, the acceleration in that plane at any train speed is easily obtained by multiplying the curvature by the square of the speed. Thus, all measurements made by the device are easily scaled to apply to a train operating at any speed. Using the simple device of FIG. 11 with a mounting similar to that shown in FIG. 14 will allow the computation of the spacing between rails using a relatively simple formula. Similarly, a measure of the difference in vertical displacement between the two rails is available from a simple formula. The rail following accelerometer 69 of FIG. 11, when using a mounting similar to the one shown in FIG. 14, will allow the computation of the spacing between the rails with a simple formula, the difference in vertical displacement of the rails with a simple formula and both the vertical and horizontal components of acceleration at any speed with simple formula.

Either digital or analogue computation equipment may be used for making the simple calculations discussed above. Similarly, there is threshold detection equipment of both digital or analogue types. This threshold detection equipment may be used to process the output of the simple calculations discussed above. This threshold detection equipment can detect whenever the spacing between the rails is either greater or less than a preselected spacing. Likewise, it can detect whenever the difference in vertical displacement between the two rails exceeds a preselected value. Similarly, the same type of device can be used to detect, for a preselected train speed, a value of centripital acceleration which exceeds a preselected value. Thus, by properly selecting the preselected values, this equipment can be used to select rail faults by degree categories. One set of values can be used to determine the location of very serious deviations from the desired rail and road bed condition. Another set can be used to determine the location of less serious deviations while others can be used to detect the location of any grade of deviation desired.

The various sensor arrangements of this invention are capable of supporting a very large number of different types of useful computations. For purposes of illustration, some of the simpler, most straight forward and effective computations have been specifically described. It is unnecessary to attempt to describe all of the different computations or combinations of computations and sensing equipment that this invention makes possible. The basic concepts explained here are versatile and that very versatility which makes it impossible to describe all facets of the invention in detail should enhance the value of the invention.

A further modification of the invention is illustrated in FIG. 13, wherein the vehicle 71 carries a microwave radar transmitter 92 which is connected to an antenna 94 and includes a receiver 93 and an antenna 95. The antennas 94 and 95 have very narrow beam widths and the beam is continually scanned back and forth across the rail at a very high rate. The vertical position of the rail can be determined from the radar range measurement, and the angular position of the scanning beam as it crosses the rail. The horizontal position may be determined from the same measurements. The horizontal crossing of the rail by the scanning beam is detected by the change in range as the scanning beam crosses the rail, and the range and beam angle are continually recorded and are continually supplied to a computer for evaluation of the position of the rail relative to the radar antenna. It should be realized, of course, that instead of microwave radar, a system which utilizes sound or light which is properly modulated to measure the round-trip range of the reflective beam could also be used. In some applications, the use of a sonic beam may be preferable, because extremely short wave lengths may be obtained at much lower frequencies than with electro-magnetic radiation.

The information obtained from the sensors and accelerometers is recorded and is fed to a computer so as to give a continuous profile and condition of the rails.

When the literature refers to an accelerometer, the interpretation is frequently that of a device that measures the component of acceleration in a particular direction. In other cases, they may actually refer to a device that measures the acceleration vector. Of course, if the device measures the acceleration vector, the acceleration components may be computed from the vector. Likewise, if enough components are measured to form a basis for the vector measurement, the vector may be computed from the components. Certainly the vector measurement is satisfactory and can supply the needed information. However, all of this information is not required for many useful applications of the invention. In many situations the much simpler device that measures only the vertical component of acceleration would be quite useful by itself as would a device that measures only the horizontal component of acceleration in a direction perpendicular to the rail. In general, these two components together will provide the information needed for rail measurement with much less use for the component of acceleration in the direction parallel to the rail. Summarizing, the vector measurement would provide the most complete measurement of acceleration; but the two components perpendicular to the rail, horizontal and vertical, would be individually very effective without the complete vector. All of these various possibilities are intended to be covered by the claims appended hereto.

Although the invention has been described with respect to preferred embodiments, it is not to be so limited as changes and modifications may be made which are within the full intended scope as defined by the appended claims.

I claim as my invention:

1. Apparatus for monitoring and testing rails and road beds comprising:
    a vehicle with rail engaging wheels;
    an odometer mounted on said vehicle to produce a position reference;
    sensing means for sensing the position of the rail as the vehicle passes by;
    correlation means receiving the outputs of said odometer and said sensing means to determine the condition of the rail;
    wherein said sensing means measures the distance from the vehicle to said rail; and
    wherein said sensing means measures the distance from the vehicle to the rail at two locations, one location being near the wheels and one location being remote from the wheels.

2. Apparatus for monitoring and testing rails and road beds according to claim 1, wherein said correlation means comprises a recording means.

3. Apparatus for monitoring and testing rails and road beds according to claim 1, wherein said correlation means comprises a computer.

4. Apparatus for monitoring and testing rails and road beds according to claim 1, wherein said sensing means comprises an accelerometer.

5. Apparatus for monitoring and testing rails and road beds according to claim 1, wherein said sensing means comprises a left rail sensor and a right rail sensor.

6. Apparatus for monitoring and testing rails and road beds according to claim 1, wherein said sensing means comprises a left rail accelerometer and a right rail accelerometer.

7. Apparatus for monitoring and testing rails and road beds according to claim 1, wherein said sensing means includes an accelerometer.

8. Apparatus for monitoring and testing rails and road beds according to claim 1, wherein said sensing means includes two accelerometers with one mounted to measure the acceleration of the rail near the wheels and the other mounted to measure the acceleration of the rail remote from the wheels.

9. Apparatus for monitoring and testing rails and road beds according to claim 1, wherein said sensing means includes an arm connected to said vehicle and engageable with the rail.

10. Apparatus for monitoring and testing rails according to claim 1, wherein said sensing means includes a pair of arms connected together by servo controlled rotary joints with one joint connected to the vehicle and the other between the pair of arms and one of said arms engageable with said rail.

* * * * *